United States Patent [19]

Chiu et al.

[11] Patent Number: 5,101,402
[45] Date of Patent: Mar. 31, 1992

[54] APPARATUS AND METHOD FOR REALTIME MONITORING OF NETWORK SESSIONS IN A LOCAL AREA NETWORK

[75] Inventors: Dah-Ming Chiu, Lexington; Ram Sudama, Concord, both of Mass.

[73] Assignee: Digital Equipment Corporation, Maynard, Mass.

[21] Appl. No.: 197,880

[22] Filed: May 24, 1988

[51] Int. Cl.$^5$ .................. H04J 1/16; H04J 3/02; G06F 11/30

[52] U.S. Cl. .................. 370/17; 370/13; 370/94.1; 340/825.06; 364/241.8; 364/242.95; 364/DIG. 1; 364/931.43; 364/940.61; 364/940.62; 395/800; 395/200

[58] Field of Search .............. 364/200, 900, 514; 370/94

[56] References Cited

U.S. PATENT DOCUMENTS

| | | | |
|---|---|---|---|
| 4,551,833 | 11/1985 | Turner | 370/60 |
| 4,638,477 | 1/1987 | Okada et al. | 370/94 |
| 4,748,620 | 5/1988 | Adelmann et al. | 370/94 |
| 4,766,530 | 8/1988 | Roslund | 364/200 |
| 4,771,391 | 9/1988 | Blasbalz | 364/514 |
| 4,774,706 | 9/1988 | Adams | 370/94 |
| 4,797,881 | 1/1989 | Ben-Artzi | 370/88 |
| 4,807,224 | 2/1989 | Naron et al. | 370/94 |
| 4,817,080 | 3/1989 | Soha | 370/17 |
| 4,891,639 | 1/1990 | Nakamura | 340/825.5 |
| 4,926,375 | 5/1990 | Mercer et al. | 364/900 |

OTHER PUBLICATIONS

Chiu et al., "A Case Study of DECnet Applications and Protocol Performance," Article which appeared in the ACM SIGMETRICS Conference, May 24-27, 1988, pp. 1-24, Sep. 30, 1987.

*Primary Examiner*—Thomas C. Lee
*Assistant Examiner*—Krisna Lim
*Attorney, Agent, or Firm*—Finnegan, Henderson, Farabow, Garrett, and Dunner

[57] ABSTRACT

A method is used for collecting information at the session level for a multiple node distributed processing system. A first component software program monitors all packets passing through a node and extracts packet headers having a predetermined format from all nodes. A second component software program identifies a session in which each of the extracted packet headers was transmitted and, for each session, accumulates characterizing information about that session and calculates statistical data concerning all the sessions.

17 Claims, 18 Drawing Sheets

Ethernet Packet Format

Packet Header Extracting

Session Information Collecting

Connect Initiate Packet Header

Data Packet Header

Process DECnet Packet

Process Session Control Packet

Process Session Data Packet

Process Link Service Packet

ACK / Packet

```
/* define parameters of histograms */
#define MAX_PACKET_SIZE         1564    /* max Ethernet packet size */
#define BYTE_PACKET_INTERVAL    32      /* interval for byte/packet histogram */
/* define size of byte per packet histogram */
#define BYTE_PACKET_HIST_SIZE   MAX_PACKET_SIZE / BYTE_PACKET_INTERVAL
#define MESSAGE_SIZE_HIST_SIZE  16      /* size of message size histogram */

/* define DECnet field length constants */
#define MAX_FORMAT1_NAME_LENGTH 16
```
— 220

```
/* define states through which a session progresses */
enum session_state_type
{
    CONNECT_RECEIVED,
    RUNNING,
    DISCONNECT_REJECT,
    DISCONNECT_INITIATE,
    CLOSED,
    REJECTED,
    CONNECT_RECEIVED_TIMEOUT,
    RUNNING_TIMEOUT,
    DISCONNECT_INITIATE_TIMEOUT,
    DISCONNECT_REJECT_TIMEOUT,
    RETURN_TO_SENDER
};
```
— 222

```
/* define possible combinations of session participants */
enum participant_type
{
    NEITHER,
    INITIATOR,
    TARGET,
    BOTH
};
```
— 224

```
/*
This structure defines all of the information which is kept for each
session.
*/ typedef struct session_record
{
    /* session identification */
    unsigned short  initiator_address;                      /* initiator DECnet address */
    unsigned short  initiator_link_id;
    unsigned short  target_address;                         /* target DECnet address */
    unsigned short  target_link_id;
    unsigned char   initiator_object;                       /* initiator object number */
    unsigned char   initiator_user[MAX_FORMAT1_NAME_LENGTH];
    unsigned char   target_object;                          /* target object number */
    unsigned char   target_task[MAX_FORMAT1_NAME_LENGTH];
```
— 226

```
    /* session status */
    unsigned char             session_opened;       /* indicates session started */
    enum session_state_type   session_state;        /* progress of session */
    enum participant_type     local_to_lan;         /* participant locations */
    unsigned char             max_visit_count;      /* for remotes, max hops */
    unsigned char             min_visit_count;      /* for remotes, min hops */
    enum participant_type     cluster_alias_address;/* cluster alias used */
    unsigned char             continuous_data_flag; /* session completed with
                                                       packets out of sequence */
```
— 228

```
    /* session connection event times */
    unsigned int    connect_init_time[3];
    unsigned int    connect_ack_time[3];
    unsigned int    retransmit_connect_time[3];
    unsigned int    connect_confirm_time[3];
    unsigned int    disconnect_init_time[3];
    unsigned int    disconnect_confirm_time[3];
    unsigned int    termination_time[3];
```
— 230

```
    /* counts of session packets */
    /* sent by initiator */
    data_record_type  initiator_data;
    data_record_type  initiator_lsi;
    unsigned short    initiator_ackdata_packets;
    unsigned int      initiator_ackdata_bytes;
    unsigned short    initiator_acklsi_packets;
    unsigned int      initiator_acklsi_bytes;
    unsigned short    initiator_connect_packets;
    unsigned int      initiator_connect_bytes;

/* sent by target */
    data_record_type  target_data;
    data_record_type  target_lsi;
    unsigned short    target_ackdata_packets;
    unsigned int      target_ackdata_bytes;
    unsigned short    target_acklsi_packets;
    unsigned int      target_acklsi_bytes;
    unsigned short    target_connect_packets;
    unsigned int      target_connect_bytes;
} session_type;
```
— 232

```
/* structure for storing information related to data and lsi packets */
typedef struct data_record
{
    unsigned short  total_packets;
    unsigned int    total_bytes;
    unsigned short  duplicate_packets;
    unsigned short  out_of_sequence_count;
} data_record_type;
```
— 234

Fig. 14

```
/* This record structure is used to maintain global (non-session-specific)
   counters of various sorts.
   ********************************************************************/
struct counts_record
{
    /* accounting parameters */
    unsigned short    version_number;           /* program version number */
    unsigned int      start_time[2];            /* time of first packet recvd */
    unsigned int      end_time[2];              /* time of last packet recvd */
    unsigned int      record_count;             /* # disk records processed */
    unsigned int      buffer_size;              /* size of each packet buffer */
    unsigned int      local_area_count;         /* # of local areas seen */
    unsigned int      routers_available;        /* # of DECnet routers seen */
    unsigned int      endnodes_available;       /* # of DECnet endnodes seen */
    unsigned int      local_nodes_active_xmit;  /* # nodes actively xmitting */
    unsigned int      local_nodes_active_recv;  /* # nodes actively recving */
    unsigned int      local_nodes_active_total; /* total active nodes */
    unsigned char     area[MAX_AREAS];          /* table of DECnet areas */

/* data link layer counters */
    unsigned int      total_decnet_pckts;       /* # of DECnet packets proc'd */
    unsigned int      network_layer_packets;    /* # of network layer packets */
    unsigned int      transport_layer_packets;  /* # of transport layer pckts */
    unsigned int      bad_message_count;        /* # of unrecognizable pkts */
    unsigned int      missed_packet_count;      /* # of pkts seen by DELUA, */
                                                /* missed by software */
    unsigned int      missed_session_count;     /* # of sessions not logged */

/* network layer counters */
    unsigned int      initialization_count;
    unsigned int      verification_count;
    unsigned int      hello_and_test_count;
    unsigned int      level1_routing_count;
    unsigned int      level2_routing_count;
    unsigned int      ni_router_hello_count;
    unsigned int      ni_endnode_hello_count;

/* transport layer counters */
    unsigned int      data_segment_count;
    unsigned int      begin_message_count;
    unsigned int      end_message_count;
    unsigned int      begend_message_count;
    unsigned int      delayed_ack_allowed_count;
    unsigned int      byte_packet_hist[BYTE_PACKET_HIST_SIZE];
    unsigned int      message_size_hist[MESSAGE_SIZE_HIST_SIZE];

unsigned int      link_service_count;
    unsigned int      interrupt_count;

unsigned int      data_ack_count;
    unsigned int      other_data_ack_count;

unsigned int      connect_init_count;
    unsigned int      retransmit_connect_init_count;
    unsigned int      duplicate_connect_init_count;
    unsigned int      connect_ack_count;
    unsigned int      connect_confirm_count;
    unsigned int      disconnect_init_count;
    unsigned int      disconnect_confirm_count;
    unsigned int      return_to_sender_count;
    unsigned int      nop_count;

/* session layer counters */
    unsigned int      total_sessions_attempted;
    unsigned int      local_sessions_attempted;
    unsigned int      local_sessions_completed;
    /* maximum number of sessions which were simultaneously active */
    unsigned int      max_active_sessions;
    /* maximum number of sessions simultaneously queued for writing to disk */
    unsigned int      max_write_sessions;
    /* number of sessions which were never opened (already running) */
    unsigned int      unopened_sessions;
    /* number of sessions which were never closed (still running) */
    unsigned int      unterminated_sessions;

/* duplicate packets which were ignored */
    unsigned int      duplicate_data_packets;
    unsigned int      duplicate_lsi_packets;
    unsigned int      duplicate_ack_packets;
    unsigned int      duplicate_connect_packets;

/* packets which could not be assigned to sessions and were ignored */
    unsigned int      discarded_data_packets;
    unsigned int      discarded_lsi_packets;
    unsigned int      discarded_ack_packets;
    unsigned int      discarded_connect_packets;
};
```

Fig. 15

A Node

APPARATUS AND METHOD FOR REALTIME MONITORING OF NETWORK SESSIONS IN A LOCAL AREA NETWORK

BACKGROUND

The present invention relates to distributed data processing systems and specifically to a method for collecting session-level information from such a system.

GENERAL NETWORK DESCRIPTION

Some distributed data processing system are configured as Local Area Networks (LAN's) having multiple nodes connected together for passing information back and forth. One such distributed data processing system network is shown in FIG. 1. The network consists of multiple nodes 30 which pass information along connecting lines 32. The connecting lines 32 may be twisted-pair wires, coaxial cables, or the like. The nodes 30 may be any of various types of devices hooked to the network, such as VAXclusters provided by Digital Equipment Corp., personal computers, workstations, minicomputers, mainframe computers, or the like.

All nodes in the network contain software responsible for organizing and coordinating the flow of information between the nodes. One type of this software is dedicated to the mechanics of establishing a connection between nodes, of transmitting information between nodes, and of ending the connection when the information transmittal is complete. Such software operates according to one of a variety of communication protocols, such as Digital Network Architecture, described below. A second type of software in the nodes is dedicated, not to the mechanics of information transmittal, but to generating the information to be transmitted, i.e., to applications programs. Examples of this second type of applications software include mail programs for sending messages between nodes, e.g., between desktop terminals and programs to control and manage offline data storage, e.g., for passing data from a storage facility to a database query program.

An extended series of information exchanges between two or more applications software programs of this second type is called a "session." Thus, for example, during a session involving a first node 34 and a second node 36, various pieces of information may pass both from the first node 34 to the second node 36 and from the second node 36 to the first node 34 before the session ends.

Several methods of controlling the communication of information between the nodes 30 during a session exist. For example, the network of FIG. 1 uses a method called "carrier-sensing multiple access with collision detection" (CSMA/CD) as defined in IEEE Standard 802.3. Under CSMA/CD, all nodes on the network are of equal importance. A node 30 can "send" information on the network only when no other node is trying to send information. If a node tries to send information at the same time that another node is also trying to send information, each node will wait a randomly-determined period of time and then attempt to resend its information. Since the period of time each node waits before attempting a resend is randomly determined, it is probable that both resends will be successful. Every node on the CSMA/CD network passively "listens" to all information sent over the network. If any node "sees" information intended for that node, the node will receive the information and take appropriate action.

Information passing between the nodes of the network is organized into packets. Each packet contains data or control information surrounded by control and routing information.

In a certain type of network called a DECnet, packets passing between the nodes of the network have a format defined by the DIGITAL Network Architecture (DNA) model. The DNA model is defined in "The DECnet DIGITAL Network Architecture (Phase IV) General Description," available from Digital Equipment Corporation. Alternately, in other types of networks, packets may have a format defined by the Open Systems Interconnection (OSI) model. A general description of the OSI model may be found in "LSO 7498, Information Processing Systems—Open Systems Interconnection Basic—Basic Reference Model" available from the American National Standards Institute.

DNA is a layered structure in which information passed between nodes is organized into packets. Each packet contains data or control information surrounded by control and routing information supplied by the various DNA layers. FIG. 2 shows the DNA hierarchical structure. Each layer in the DNA structure is responsible for a different conceptual level of the process of sending or receiving a data packet. The Application layer is the highest layer followed by the Session Control layer, the Transport layer, the Network Routing layer, the Data Link layer, and the Physical layer. The Application layer, as the highest layer, supports user application programs. The Session Control layer manages initialization, conduct, and termination of sessions for application programs. The Transport layer's functions include: recovery from data loss, i.e., request to resend; flow control to match the transmission rate to the reception rate; congestion avoidance; and segmentation and reassembly of user messages.

The Network Routing layer routes messages back and forth between an initiator node and a target node. The initiator node is the node which first begins a session by sending a connection request to another node. The target node is the recipient of the connection request. At various times during a single session, the initiator and target nodes may be either a source node (sending a packet) or a destination node (receiving a packet), but the labels 'initiator' and 'target' stay fixed for the duration of a session.

The Data Link layer defines the protocol concerning data integrity and physical channel management. The Physical layer encompasses a part of the device driver for each communications device plus the communications hardware itself. Each DNA layer uses the services of the layer below it to send information between the nodes of the network.

One long message may be broken up into several shorter packets. Each packet containing a part of a single message contains a sequence number indicating the order in which the packets were sent. Because not all packets take the same route through the network from, for example, a sending node 34 to a receiving node 36, data packets may arrive at the receiving node 36 in an order other than that in which they were sent. The sequence numbers contained in the packets enable the Transport layer of the receiving node to reassemble the received data packets in the correct order, i.e., the order in which they were sent. In addition, the sequence numbers in the packets enable the receiving node 36 to detect that a data packet has not been received, since such a failure will cause a gap in the sequence numbers of the received packets.

DECnet networks operate using the Ethernet standard for data transmission. This standard governs the protocol used in transmitting data at a low conceptual level. It is compatible with the Physical and Data link levels of the DNA communications protocol. DECnet networks are also called Ethernet networks since DECnet uses the Ethernet standard. However, not all Ethernet networks contain DNA packets exclusively. An Ethernet network may incorporate, for example, systems using both DNA and the more general OSI communication protocols. In other words, both DECnet packets and OSI packets generated by DECnet sessions and OSI sessions, respectively, may be travelling in an Ethernet network simultaneously.

The portions of the packets generated by the Ethernet layers (the Physical and Data Link layers) of the node software have the same format for both DNA and OSI packets and contain a field identifying whether the remainder of the packet was generated using DNA or OSI protocol.

FIG. 3 shows a typical Ethernet packet 40. The packet contains a Preamble field 42, a Destination Data Link Address field 44, a Source Data Link Address field 46, a Protocol Type field 48, a Data field of varying length 50, and a Frame Check Sequence field 52. The Preamble field 42 contains data indicating the beginning of a packet. The Destination and Source Data Link Address fields 44 and 46 indicate addresses of the destination node and source node, respectively. The Protocol Type field 48, in this embodiment, indicates whether the Data field 50 of the packet was generated using DNA or OSI protocol. The Data field 50 contains the information to be communicated to the destination node. The Frame Check Sequence field 52 is used to detect transmission errors. The packet of FIG. 3 optionally may also contain a Data Length field indicating the length of the Data field 50.

Packets on an Ethernet network may be sent using one of two basic methods: single destination addressing and multicasting. In single destination addressing, a packet is sent from a first node to a second node. The destination data link address field of the packet indicates that the destination node is a single node. In multicasting, a single node broadcasts information to multiple nodes and the destination data link address field of the packet indicates that the destination is a group of nodes.

Nodes in an Ethernet network may operate to receive packets in one of two basic modes: normal mode and promiscuous mode. In normal mode, a node's physical layer "sees" only those packets addressed to it. In promiscuous mode, a node's Physical layer "sees" all packets that appear on the Ethernet. Thus, a node operating in promiscuous mode would normally monitor all packets on a typical LAN.

On certain types of LAN's and on more complex networks, called Wide Area Networks (WAN's), however, even nodes operating in promiscuous mode will not "see" all packets travelling in the network. FIG. 4 shows a WAN 55 in which several LAN's 56 and 58 are connected together using a router unit 62. LAN 56 contains a bridge unit. Bridge units connect portions of a LAN when the physical distance between the portions would otherwise make such connections unfeasible and also serve to isolate traffic on various sections of a LAN. A bridge unit will only let packets for nodes on its output side pass through. For example, in FIG. 4, bridge unit 60 will let a packet from node A to node C through. As shown in FIG. 4, several LAN's may be connected together into a single WAN by a router unit. A router unit will only let packets using single destination addressing mode to address nodes on its output side pass through. For example, in FIG. 4, router 62 will let a packet from node A to node E through. In contrast to bridges, however, routers will not let multicast packets pass through.

A typical DECnet WAN may contain up to 64 ($2^6$) network areas. A network area may consist of a single LAN, or, alternately, a network area may consist of several LAN's or a single LAN may contain several network areas. Each network area may contain up to 1024 ($2^{10}$) nodes. Thus, each node in a DECnet network is addressable by a 16 bit address (6 bits for the network area and 10 bits for the node number).

Nodes in a WAN may be classified as either remote or local relative to a given network area. A remote node is a node that packets must leave the network area of the sending node to reach. A local node is a node that packets can reach without leaving the network area. Thus, a node initially classified as a local node may become a remote node if changes in network configuration cause packets for that node to be re-routed outside the network area and vice versa.

Monitoring Network Performance

In order to configure a network most efficiently for the applications communicating over it, it is desirable to understand the nature of the activities of the applications and how these activities load the network.

Many existing systems collect network statistics at the Physical and Data Link layers, doing such things as counting an average number of bytes per packet, an average number of packets observed per second. Such data is useful for configuring the hardware of a network, since it reveals system bottlenecks and faulty hardware components. Physical and Data Link layers level monitoring does not, however, reveal which applications are initiating sessions or executing on target nodes. Neither does it reveal distributions of network usage by different applications. What is needed is a network monitor system that can monitor all packets on the network in real time, extract statistical and characterizing information from the packets, and organize the information in these packets to create a complete and accurate picture of network usage by the various applications that initiate sessions on the network. In addition to operating in real time, such a system should condense the extracted data to a manageable size. Ideally, such a system would be able to separate DECnet packets from packets using the OSI and other similar protocols and would collect session information only for DECnet applications.

SUMMARY OF THE INVENTION

A first object of the invention is to collect information from a network for each of a plurality of software sessions.

A second object of the invention is to collect statistical data from a network about a plurality of software sessions.

A third object of the invention is to collect session information from a network in real-time.

A fourth object of the invention is to store the collected session information in a condensed form.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The present invention overcomes the problems and disadvantages of the prior art and achieves the objects of the invention by monitoring the network at the session level and by keeping statistics on individual sessions.

To achieve the objects and in accordance with the purpose of the invention, as embodied and broadly described herein, the invention comprises a method for collecting information from a multiple node distributed processing system that supports information exchange defined by a plurality of types of software sessions. The plurality of types of software sessions have overlapping times of execution and consist of transmissions of a plurality of session level packets, including data packets between at least two nodes. Some of the session level packets have a predetermined format, which includes a packet header. The transmitted plurality of session level packets pass through selected ones of the nodes of the distributed data processing system. The packet headers include a plurality of types of information characterizing the session and a session identifier identifying the specific session in which the packet is being transmitted. The method includes the following steps, performed by a predetermined one of the nodes: monitoring the session level packets passing through the predetermined one node; extracting a packet header from each of the monitored session level packets of the predetermined format; identifying the software session in which each of said extracted packet headers was transmitted; and accumulating by session identifier the characterizing information contained in the extracted header statistical data for the software sessions having said predetermined format.

The accompanying drawings, which are incorporated in and constitute a part of the specification, illustrate one embodiment of the invention and, together with the description, serve to explain the principle of the invention.

BRIEF DESCRIPTION OF THE DRAWINGS

FIG. 14 is a file created according to a preferred embodiment of the present invention.

FIG. 15 is another file created according to a preferred embodiment of the present invention.

DESCRIPTION OF THE PREFERRED EMBODIMENT

Reference will now be made in detail to the preferred embodiment of the invention, an example of which is illustrated in the accompanying drawings. Wherever possible, the same reference numbers will be used throughout the drawings to refer to the same or like parts.

Figure 1:
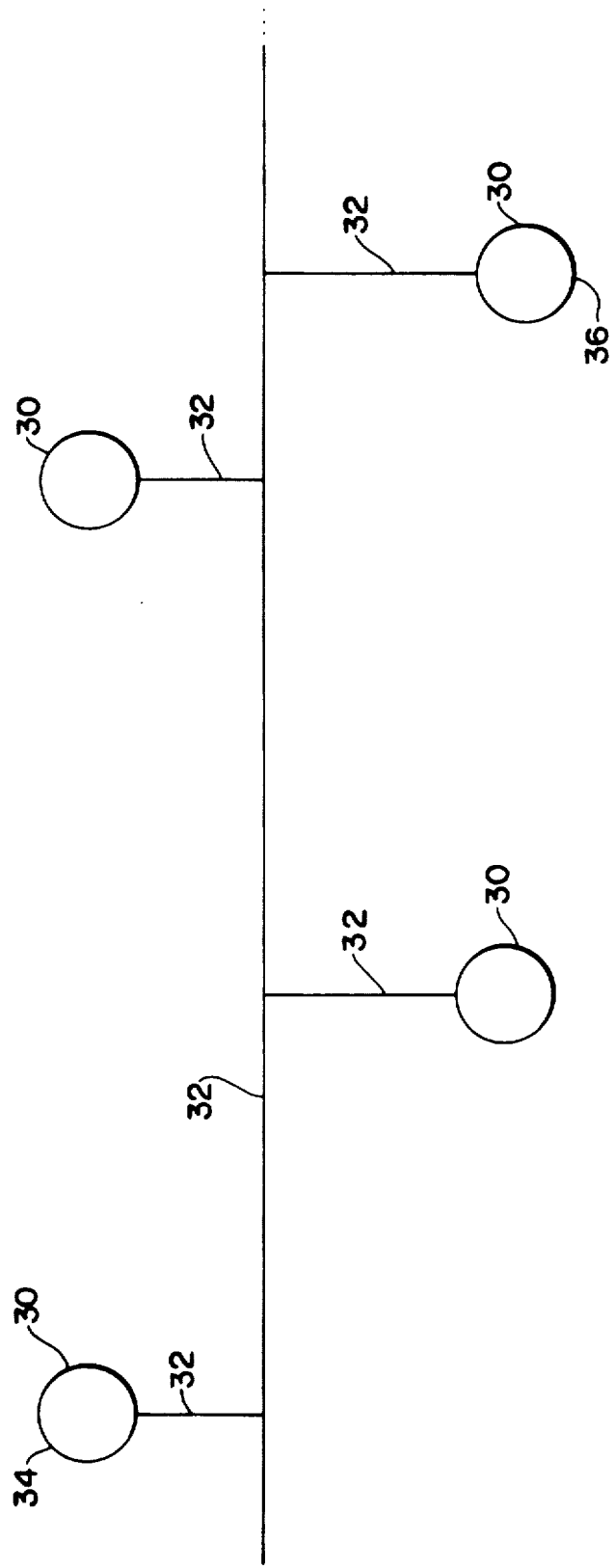
FIG. 1 is a general block diagram of a network.
Figure 2:
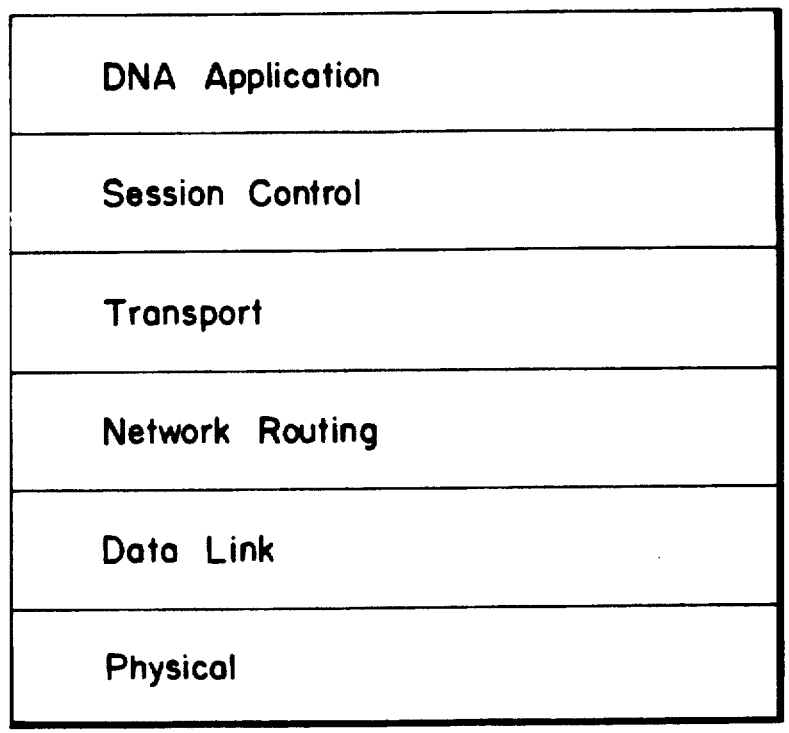
FIG. 2 is a representation of different layers of communications protocols.
Figure 16:
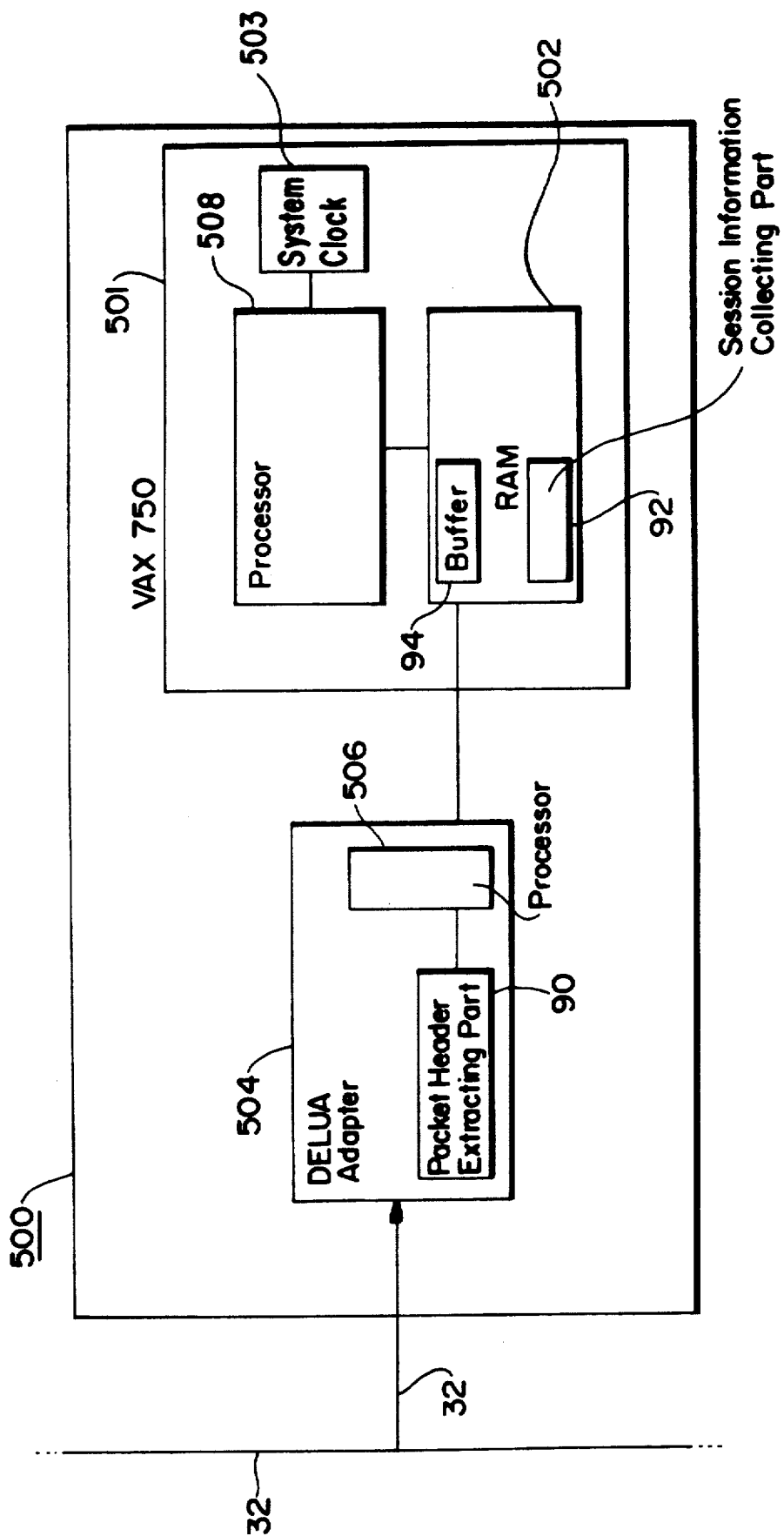
FIG. 16 is a block diagram of a node.

The present invention is preferably embodied in a software program executing on a node of an Ethernet network such as the network of FIG. 1, where the node executing the software program is operated in promiscuous mode. As shown in FIG. 16, a node 500 comprises a VAX 750 minicomputer 501, (including a memory 502) and a DELUA Unibus Adapter 504, both of which are manufactured by Digital Equipment Corporation. Unibus and DELUA are trademarks of Digital Equipment Corporation. Packets pass from the connecting lines 32 into the node via the DELUA Adapter 504. It should be noted, however, that the method of the present invention could also be embodied in a software program executing on some other hardware configuration compatible with an Ethernet network. For instance, the DELUA Unibus Adapter could be replaced by a DELUA Q-BUS Adapter (also manufactured by Digital Equipment Corporation), or the VAX 750 minicomputer 501 could be replaced by some other data processing system. Q-BUS and DELQUA are trademarks of Digital Equipment Corporation.

Figure 5:
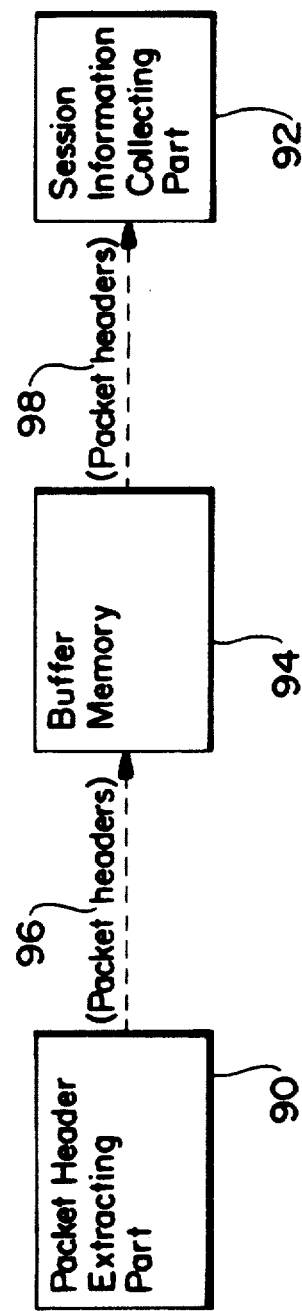
FIG. 5 is a diagram of two software programs communicating through a buffer memory in accordance with a preferred embodiment of the present invention.

As shown in FIG. 5, the preferred software program of the present invention includes two component software programs: a packet header extracting part 90 and a session information collecting part 92. The packet header extracting part 90 is a software program stored in a memory of the DELUA Unibus Adapter 504 and executed by a processor 506 in the DELUA. In this embodiment, the software program is written in 68000 assembly language. Alternatively, the packet header extracting part 90 could be a software program stored in a Read Only Memory (ROM) contained with the DELQA Q-BUS Adapter of the node 500. The session information collecting part 92 is a software program stored in the memory of the VAX 750 microcomputer 501 and executed by a processor 508 in the VAX 750 microcomputer 501. The software program for the session information collecting part 92 preferably is written in the C programming language.

The packet header extracting part 90 and the session information collecting part 92 operate independently. That is, each performs separate steps of the method of the present invention without regard to the steps being performed by the other. As shown in FIG. 5, the two parts 90 and 92, respectively, communicate through a buffer memory 94 of the node 501 into which the packet header extracter part 90 inputs data 96 and from which the session information collecting part 92 outputs data 98. The buffer memory 94 is preferably a ring buffer, but any suitable buffer design could be used without departing from the scope of the present invention.

Figure 6:
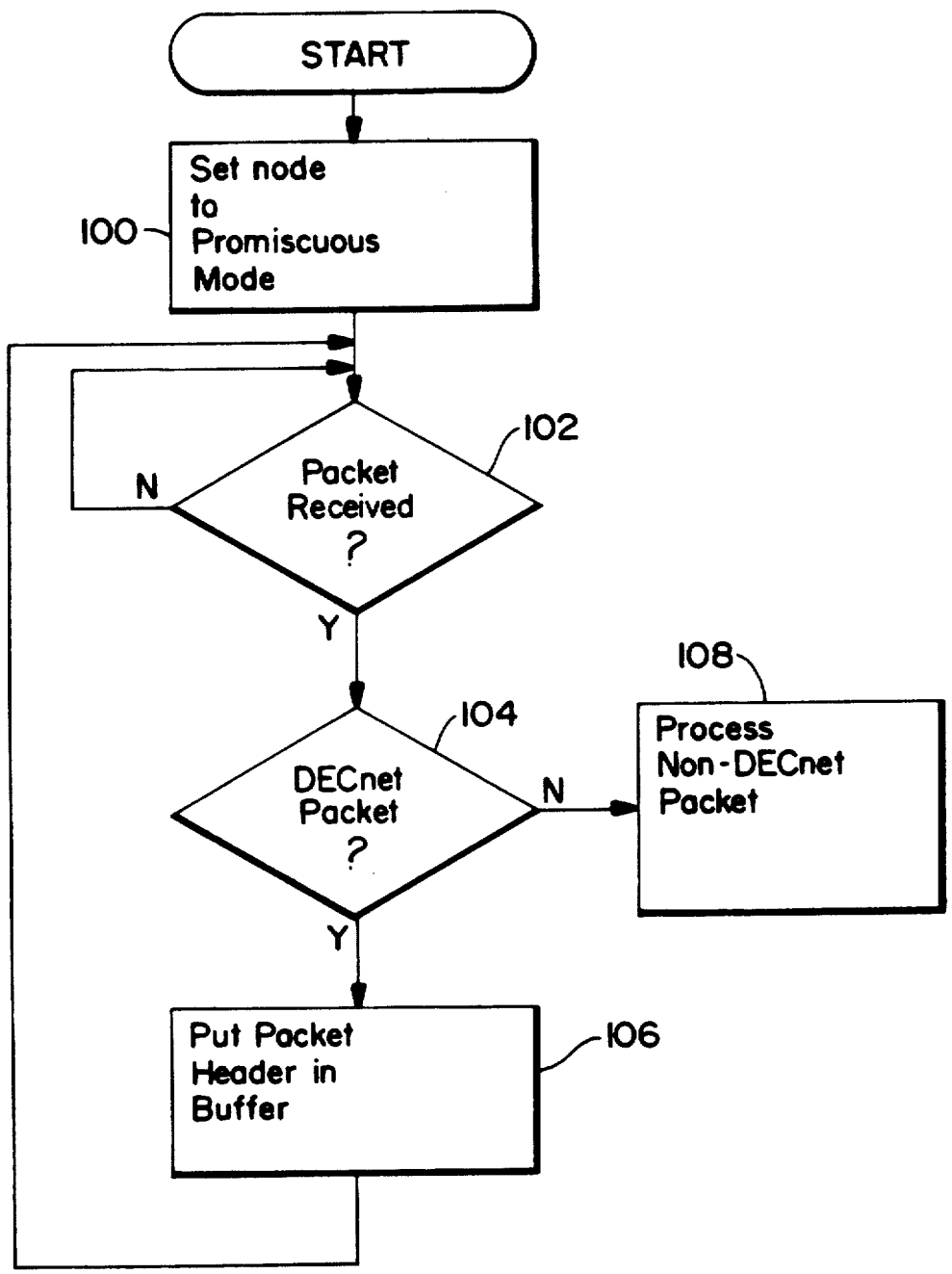
FIG. 6 is a flow chart of a preferred method of packet header extraction in accordance with the present invention.

FIG. 6 is a flow chart of the steps of the method of the present invention performed by the packet header extracting part. First, the node 501 is set to operate in promiscuous mode (Step 100). This means that the node will be able to monitor or "see" all packets that pass through the network (if the node is part of a LAN) or a percentage of packets that pass through the network (if the node is part of a WAN). Next, the packet header extracting part 90 waits for a packet to pass through the node 501 (Step 102). When the node "sees" a packet, the packet is checked to determine if it is a DECnet packet, i.e., a packet sent using the Digital Network Architecture (DNA) communications protocol (Step 104). If the received packet is a DECnet packet, a DECnet packet header is extracted from the packet and placed in the buffer memory (Step 106) and control is returned to Step 102. If the received packet is not a DECnet packet (e.g., a packet utilizing a more generalized OSI protocol), the packet is processed (Step 108). Alternatively, the non-DECnet packet could simply be discarded at this point and not processed. It should be noted that, instead of being stored in the buffer memory of the node, the extracted packet headers could also be stored in a secondary memory unit, such as a magnetic disk drive for processing at a later time.

In the preferred embodiment, the packet header extracting part 90 is quite short and is optimized for speed. The DELUA Unibus Adapter 504 is able to receive packets in real time and it is important that the software constituting the packet header extracting part 90 also be able to execute its method steps in real time. Because the memory buffer 94 is large enough to contain a plurality of packet headers simultaneously, it is not as important that the session information collecting part 92 execute in real time. The session information collecting part 92 can take longer to execute, allowing the buffer memory 94 to fill up during times when the packet send rate is high.

Figure 7:
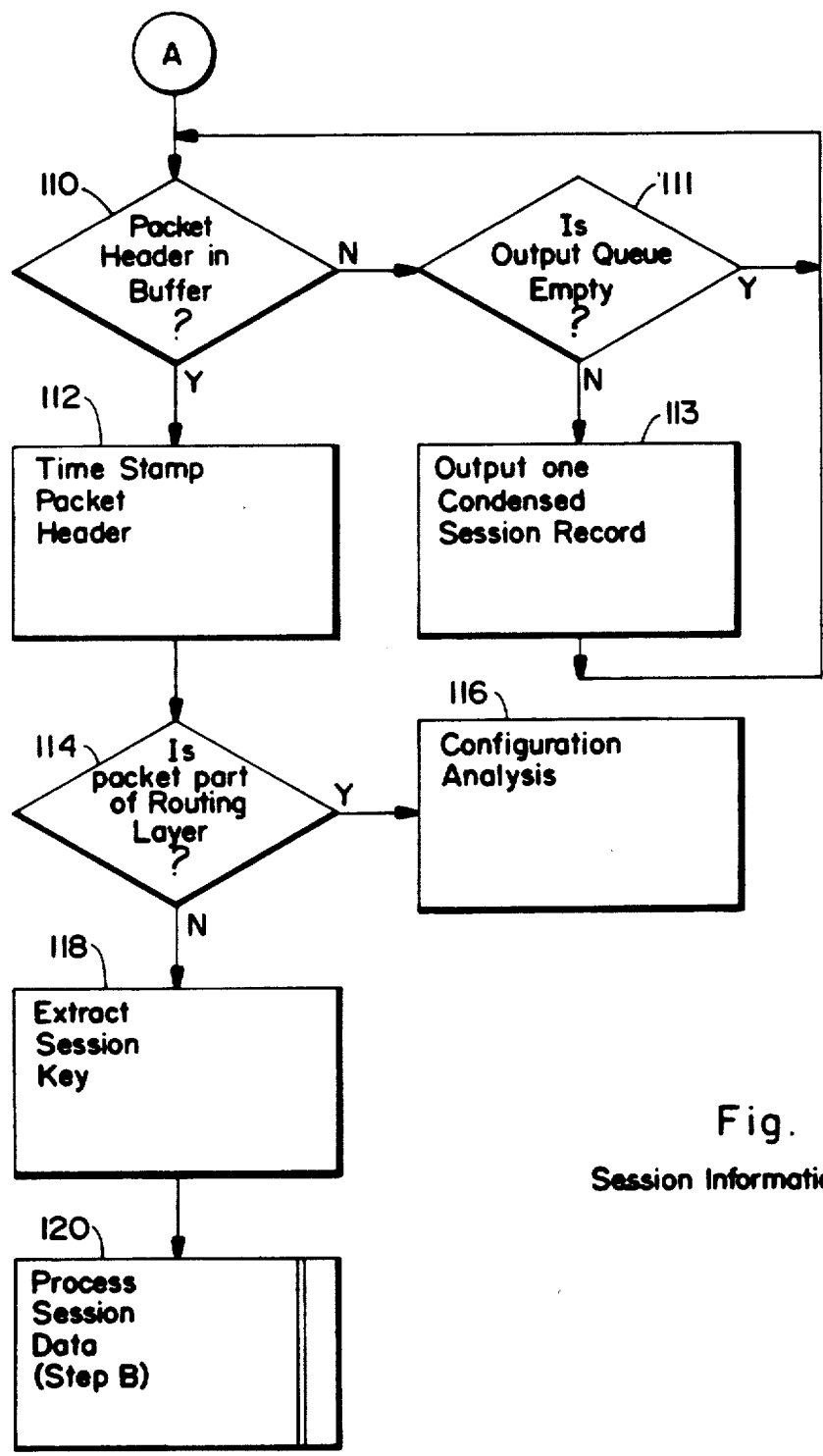
FIG. 7 is a flow chart of a preferred method of session information collecting in accordance with the present invention.

FIG. 7 is a flow chart of the steps of the method of the present invention performed by the session information collecting part 92. First, the session information collecting part 92 waits for a packet header to be placed in the buffer memory 94 (Step 110). If a packet header is not present (Step 110), then the status of an output queue is checked (Step 111). If the output queue is empty, control returns to Step 110. Otherwise, if the output queue is not empty, one record from the output queue is output to a secondary storage device, such as a disk drive (Step 113). (The output queue is discussed further in connection with FIG. 10.) When a packet header is detected in the buffer memory 94 (Step 110), the packet header is time stamped using system clock 503 of FIG. 16 (Step 112) and a test is performed to determine if the packet containing the packet header was sent by the Routing layer (Step 114). If yes, the packet header does not contain information relevant to the sessions. However, the packet header is analyzed for information relevant to the current configuration of the network, such as whether a node is remote or local (Step 116). If the packet is not part of the Routing layer, it must be part of the Transport layer. Thereafter, a unique session key is determined from the header (Step 118) and the packet is processed to collect the desired session level information (step 120). Step 120 is shown in more detail in FIG. 9.

Figure 3:
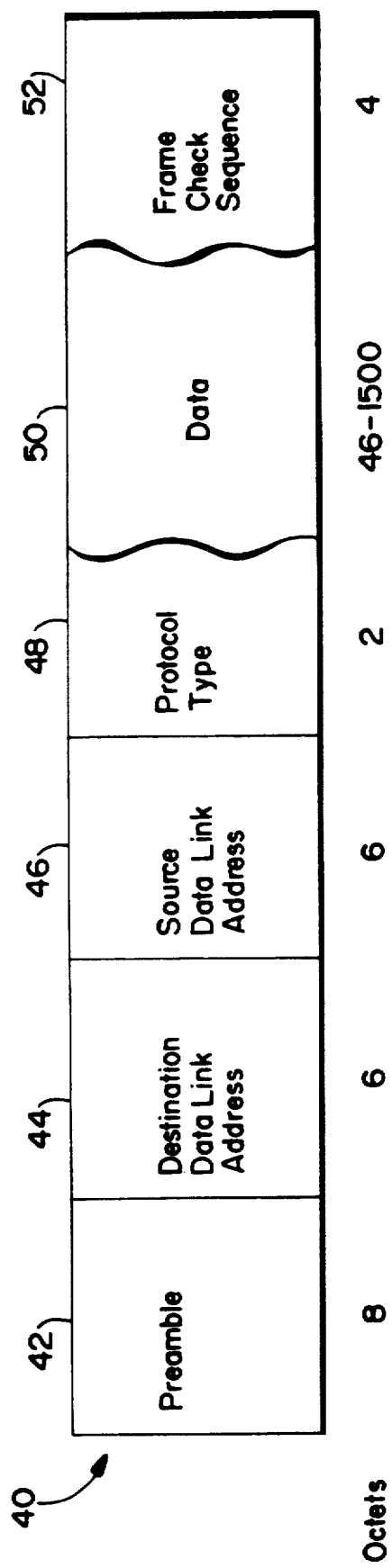
FIG. 3 is a representation of an information packet which can be used by the network of FIG. 1.
Figure 8A:
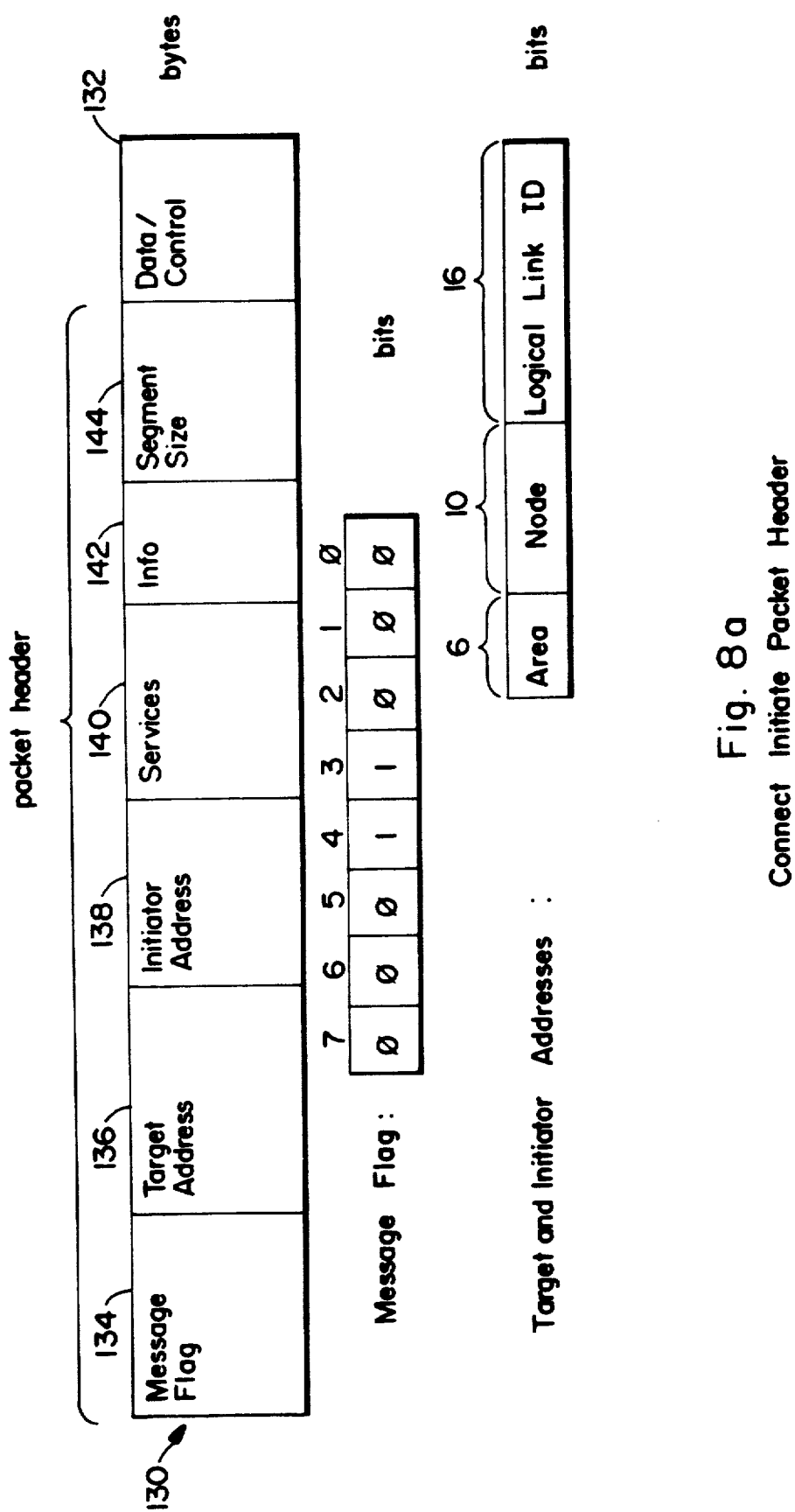
FIG. 8a shows a format of a DECnet session packet header.

FIG. 8a shows a format of a typical DNA packet header 130 and a corresponding data/control field 132. The packet header 130 and data field 132 correspond to field 50 of FIG. 3. The packet header 130 of FIG. 8a is for a 'connect initiate' packet, i.e., a packet initially sent by an initiator node to a target node to initiate a session. The packet header includes a message flag field 134, a target address field 136, a initiator address field 138, a services field 140, an info field 142, and a segment size field 144.

The message flag field 134 indicates a type of packet. For example, as shown in FIG. 8a, a "1" in bits 3 and 4 of the message flag field 134 indicates that the packet is a 'connect initiate' packet. The target address field 136 indicates an address of the target node. The initiator address field 138 indicates an address of the initiator node. Both the target and initiator node addresses for a session include a logical link ID which is assigned to a session when it is initiated. The services field 140 indicates such information as whether packets are to be encrypted and whether various types of packets are to be counted during the session. The info field 142 includes a version number for the DNA software generating the packet. The segment size field 144 is the maximum number of bytes of data that can be contained in one packet. The data/control field 132 contains data and control information to be communicated to the target node.

Figure 8B:
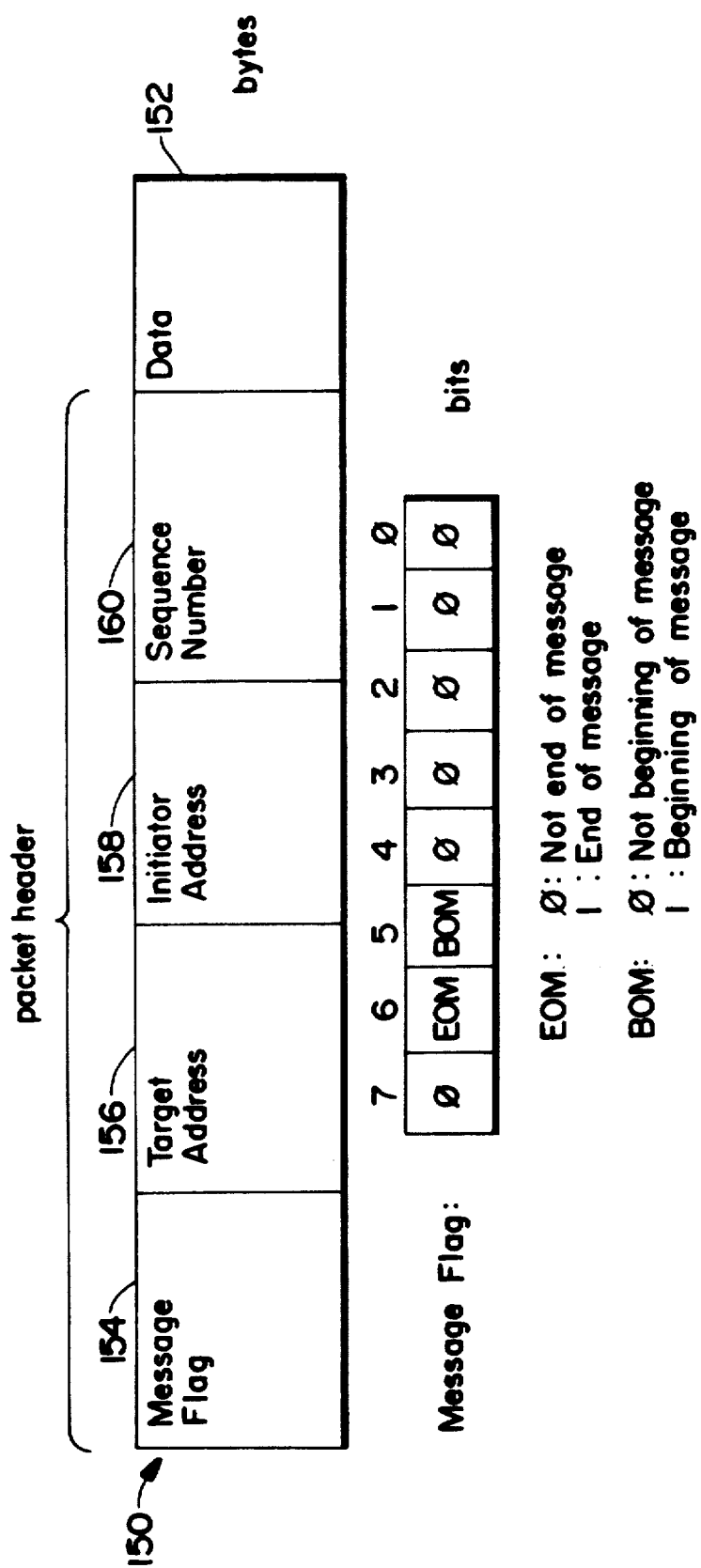
FIG. 8b shows another format of a DECnet packet header.

FIG. 8b shows a second type of DNA packet header 150 and a corresponding data field 152. The packet header 150 and data field 152 correspond to field 50 of FIG. 3. The packet header 150 of FIG. 8b is for a 'data' packet, i.e., a packet communicating information from a source node to a destination node during a session. The packet header 150 may optionally include fields for acknowledging the receipt of previously sent packets.

The message flag field 154 indicates the type of packet being sent. For example, as shown in FIG. 8b, a "1" in bit 5 of the message flag field 154 indicates that the current packet is the first packet in a message split into a plurality of packets. As a second example, a "1" in bit 6 of the message flag field 154 indicates that the current packet is the last packet in a message split into a plurality of packets. The target address field 156 indicates an address of the target node. The initiator address field 158 indicates an address of the initiator node. The sequence number field 160 holds one of the numbers in a numerical sequence assigned to the plurality of packets making up the message. The data field 152 contains the information to be communicated from the source node to the destination node.

Other types of packets can exist on a DECnet network. The various types of DNA packets include 'terminate session' packets; 'link service' packets; and 'ACK' packets acknowledging receipt of a packet.

In addition, yet other types of packets exist on a DECnet. These other types of packets are well-known in the networking art and will not be described herein.

Figure 8C:
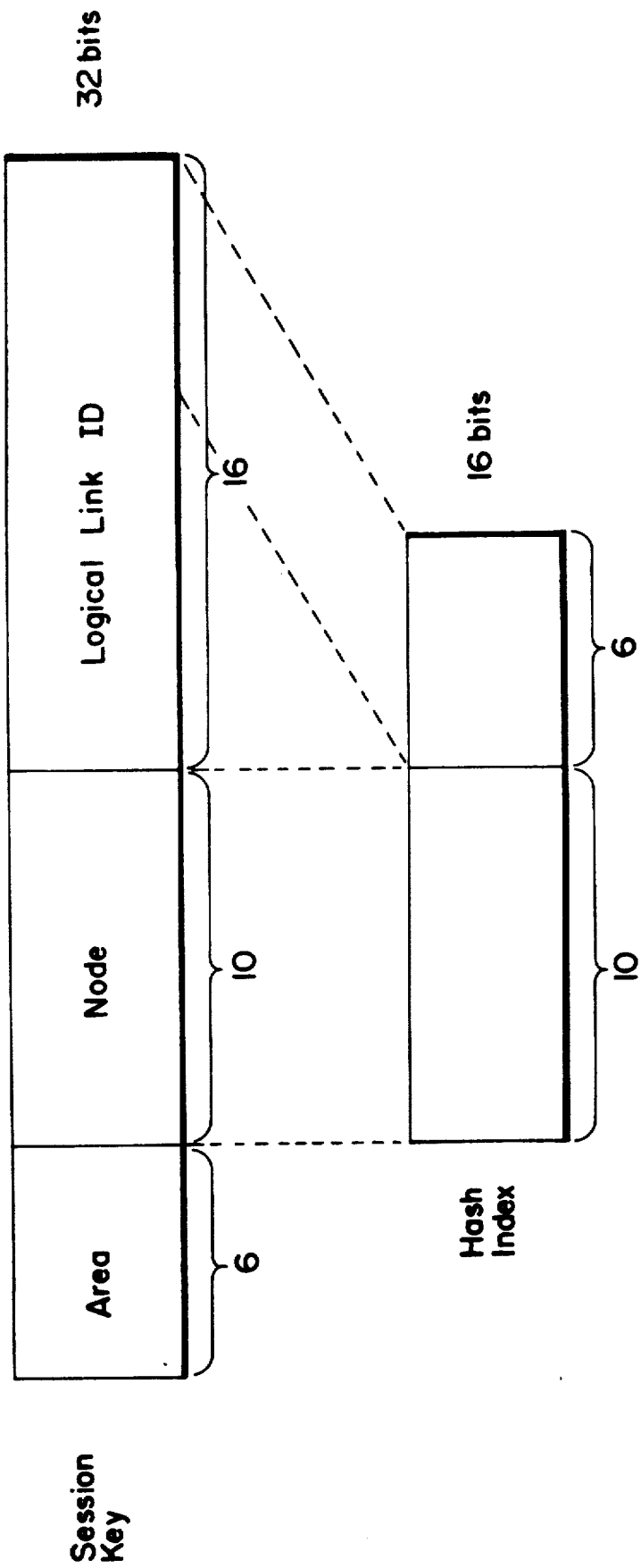
FIG. 8c shows a format of a session key extracted from the packet header of FIG. 8a or FIG. 8b.

FIG. 8c shows a session key which has been extracted from either the packet header of FIG. 8a or the packet header of FIG. 8b. A unique session key is extracted for each session and serves to identify the packets of the session. Each session key preferably is 32 bits long and comprises 16 bits from the Initiator DECnet Node Address field and 16 bits from the Initiator Logical Link Address field of the initiator address 138/158 in the packet header.

Figure 9:
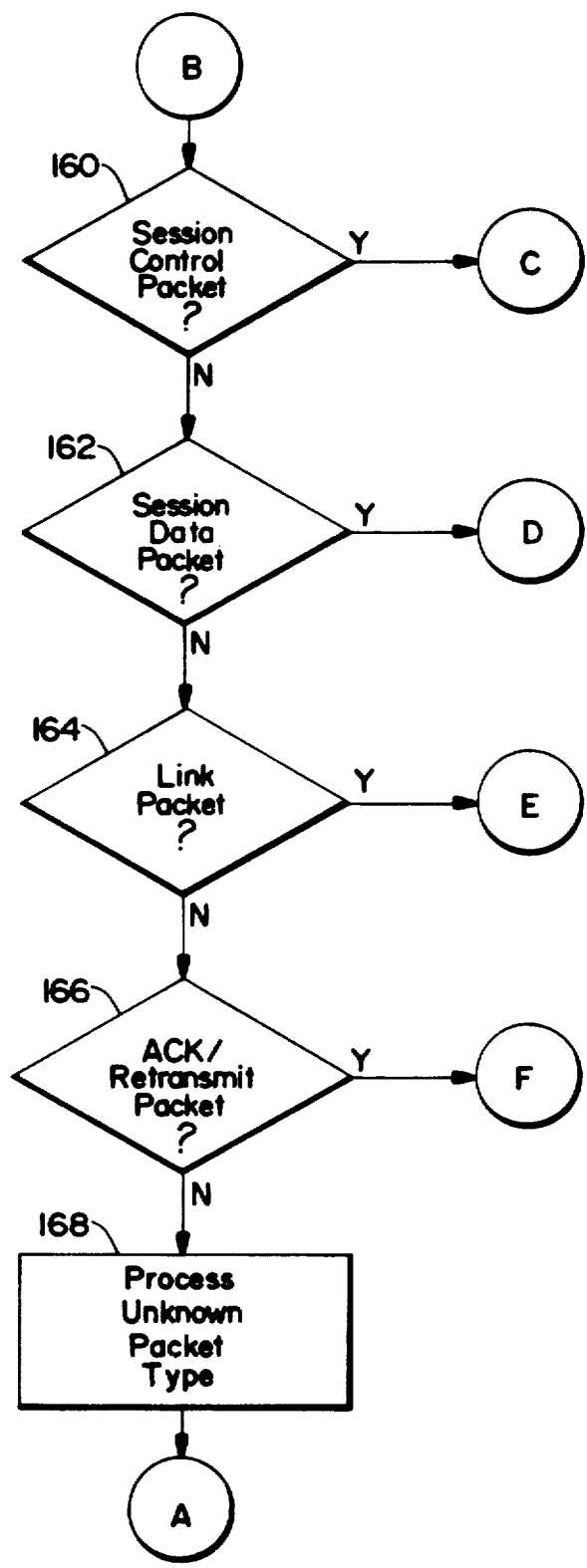
FIG. 9 is a flow chart of a preferred method of DECnet packet processing, in accordance with the present invention.

FIG. 9 is a flow chart of the steps of the method of the present invention performed by the session information collecting part 92 to process a packet header from a Transport Layer level packet. If the packet header is from a Session Control packet, such as the 'connect initiate' packet of FIG. 8a, (Step 160), control passes to Step C of FIG. 10. If the packet header is from a data packet, such as the packet header of FIG. 8b, (Step 162), control passes to Step D of FIG. 11. If the packet header is from a Link service packet (Step 164), control passes to Step E of FIG. 12. If the packet header is from an ACK packet (Step 166), control passes to Step F of FIG. 13. If the packet header is from some other type of packet, then the unknown packet type is processed (Step 168).

Figure 10:
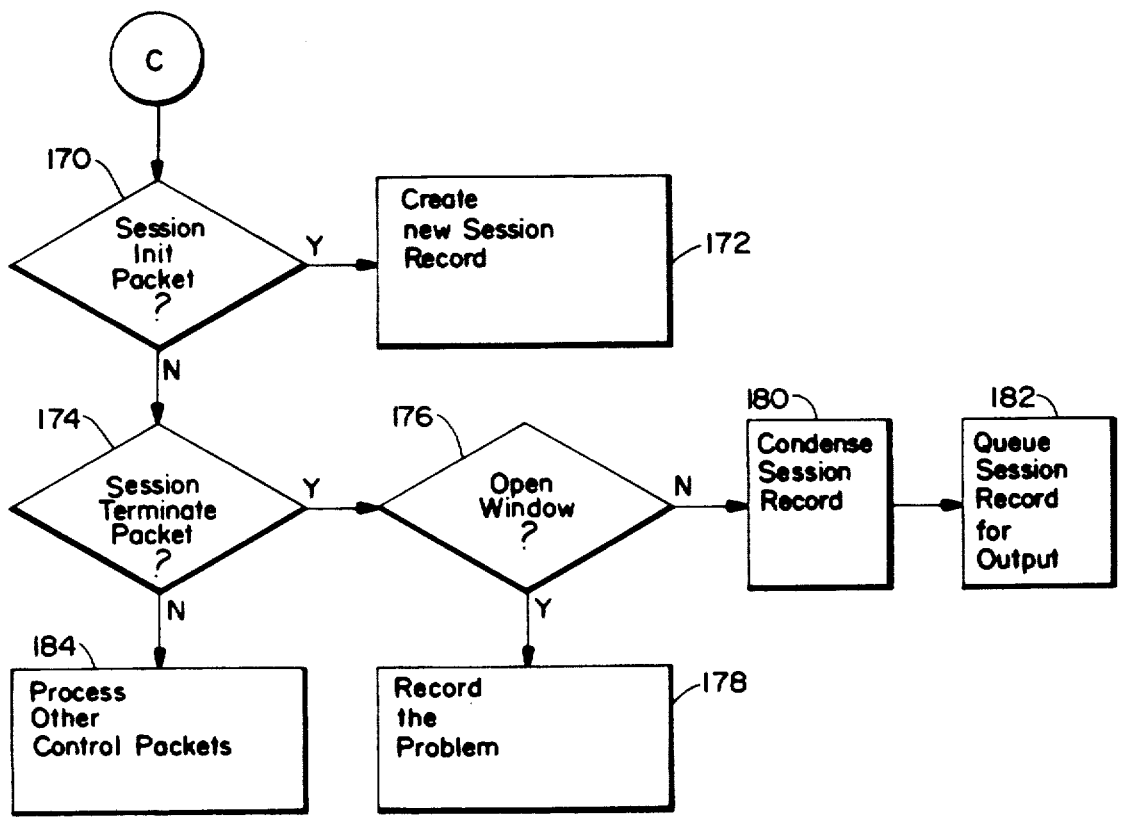
FIG. 10 is a flow chart of a preferred method of session control packet processing in accordance with the present invention.

FIG. 10 is a flow chart of the method of the present invention performed by the session information collecting part when the extracted packet header is from a session control packet. If the packet is a connect initiate packet (Step 170), a new session record identified by the session key is created in a memory of the node (Step 172) Each session record has the format of FIG. 14.

If the packet is a terminate session packet (Step 174), then a test is performed to see whether session data packets received previously for the session possess sequential sequence numbers (Step 176), i.e., that all session data packets have been received. A gap in sequence numbers indicates that at least one data packet was not received. If the previously received data packets do not possess sequential sequence numbers, then the problem is logged (Step 178). If the previously received data packets do possess sequential sequence numbers (Step 180), then the session record identified by the session key is and located in the memory of the node and is condensed and placed in an output queue (Step 182). Use of an output queue allows the session data collecting part to postpone outputting the condensed session records until the packet send rate is low and, thus, enables the session data collecting part to process incoming packets at a speed closer to real-time. The output queue preferably is maintained by the session data collecting part using queuing algorithms well-known in the art. If the packet is some other type of control packet, the packet is similarly processed (Step 184).

Figure 11:
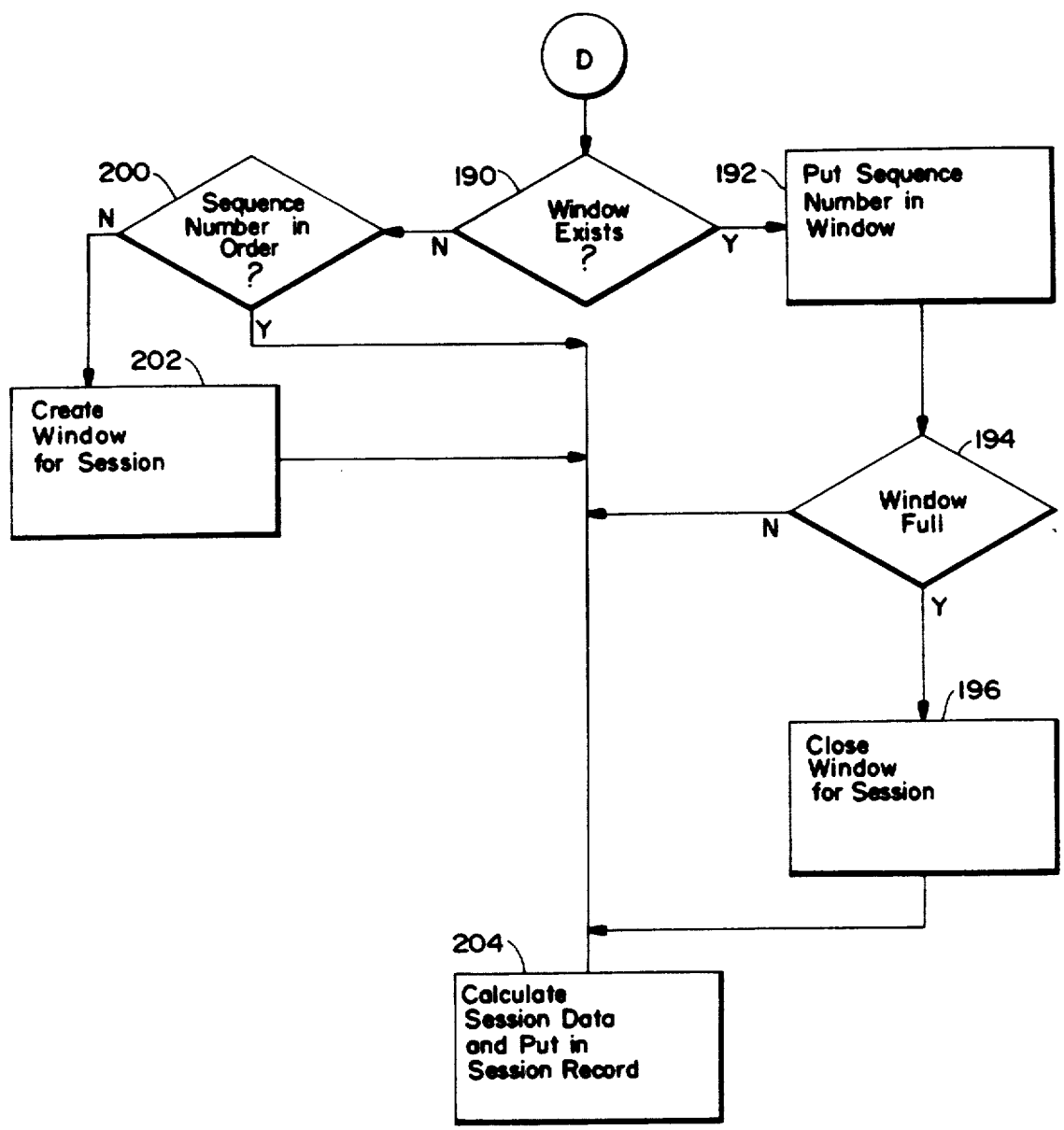
FIG. 11 is a flow chart of a preferred method of session data packet processing in accordance with the present invention.

FIG. 11 is a flow chart of the method of the present invention performed by the session information collecting part 92 when the extracted packet header is from a session data packet. First, a test is performed to determine if previously received data packets identified by the session key contained out-of-order sequence numbers (Step 190).

Such an out-or-order condition causes a "window" data structure associated with the session key to be created in the memory of the node. As session data packets are received out of sequential order, they are inserted into the window either until the window is full, i.e., until the sequence numbers of the received data packets comprise an unbroken sequence, in which case the window is closed, or until a session termination packet is received, in which case an error is logged.

If a window exists (Step 190), then the sequence number of the packet header being processed is inserted into the window (Step 192) and a test is performed to determine if the window is full, i.e., if an unbroken string of sequence numbers has been received (Step 194). If yes, the window is closed (Step 196).

If a window for the current session key does not exist (Step 190), a test is performed to determine whether the current session data packet contains a sequence number one greater than the sequence number of the previously received session data packet (Step 200). If not, a packet is missing and a window associated with the current session key is created (Step 202). After any of Steps 194, 196, 200 or 202, data from the session data packet header is placed in the session record in the memory of the node for the current session key (Step 204). A preferred embodiment of the present invention uses a hashing function based on the current session key to access the session record associated with that key. The details of such a hashing function are well known in the art and will not be described in detail herein.

Figure 12:
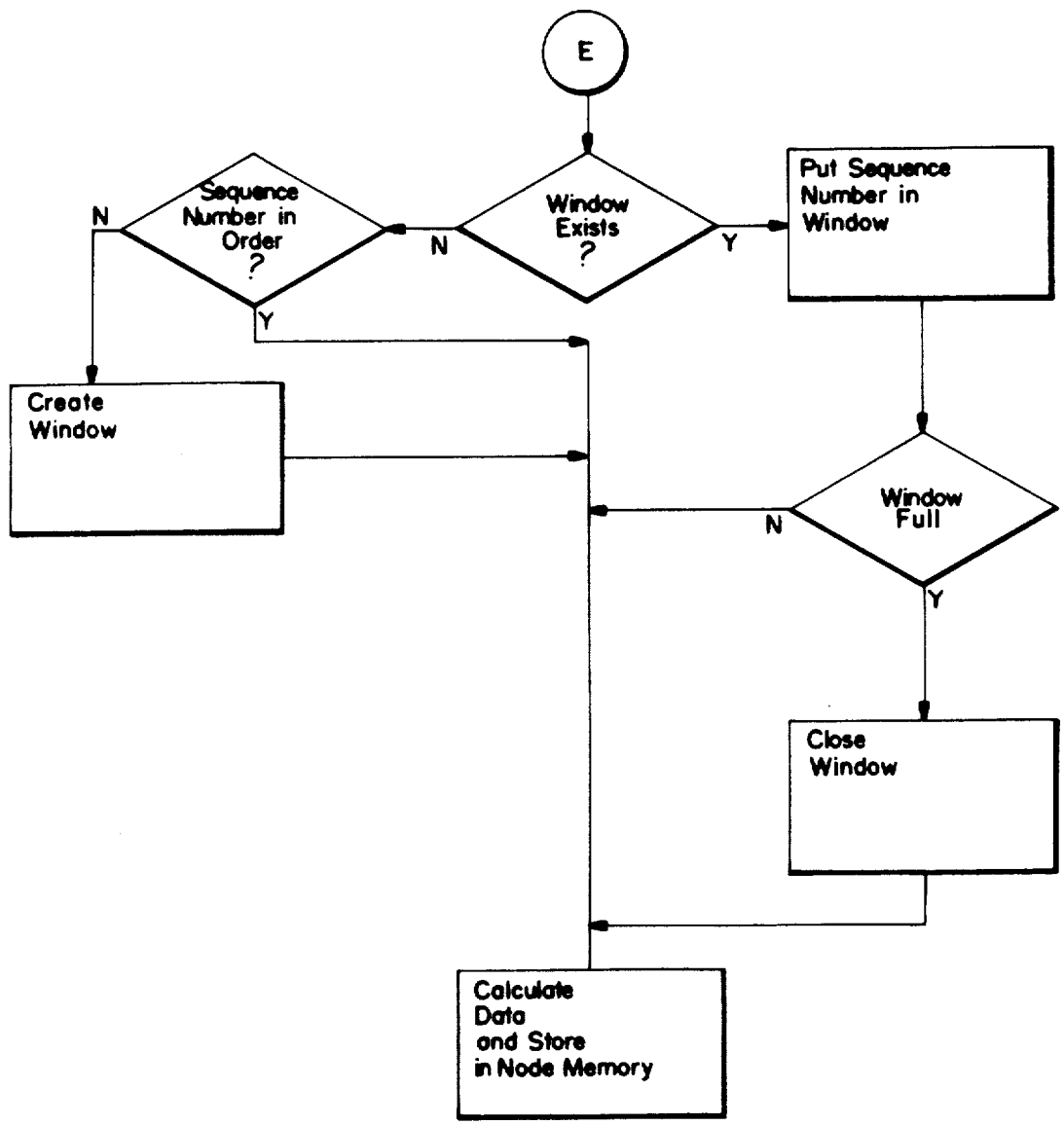
FIG. 12 is a flow chart of a preferred method of DECnet packet processing in accordance with the present invention.

FIG. 12 is a flowchart of the method of the present invention performed by the session information collecting part 92 when the extracted packet header is from a Link layer packet. The method of FIG. 12 is similar to that of FIG. 11.

Figure 13:
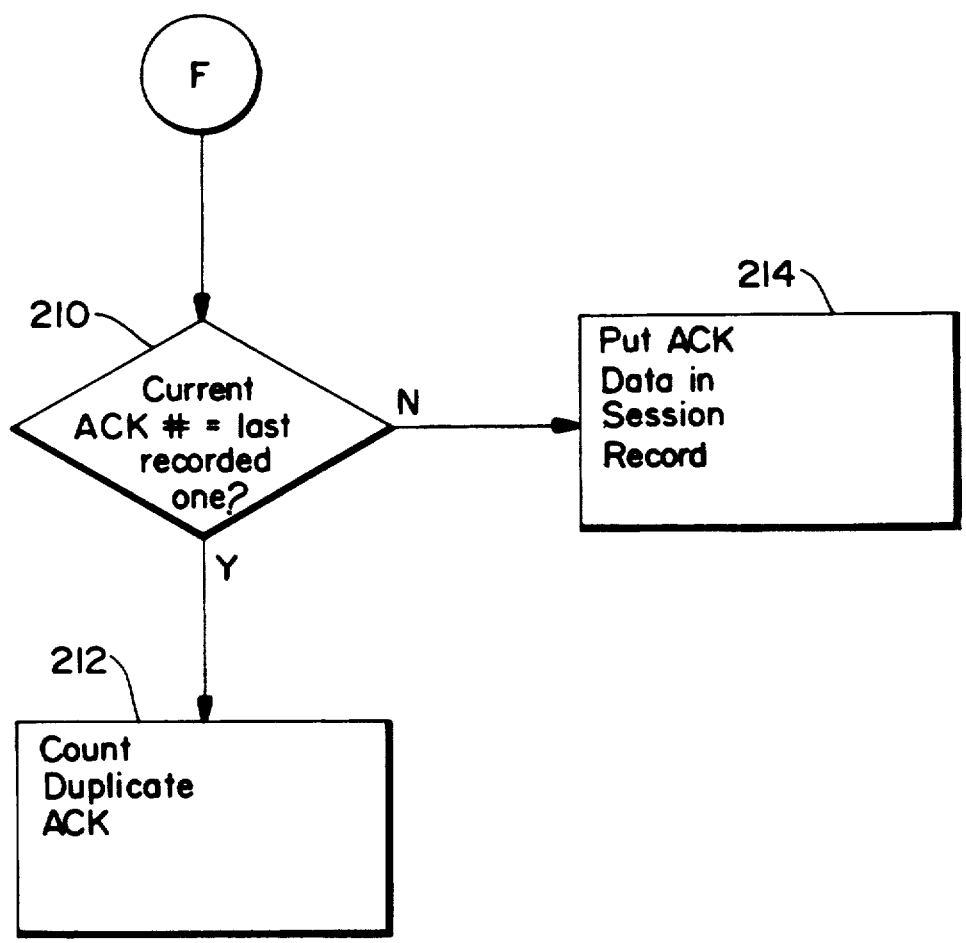
FIG. 13 is a flow chart of a preferred method of DECnet packet processing in according with the present invention.

FIG. 13 is a flowchart of the method of the present invention performed by the session information collecting part when the extracted packet header is from the ACK packet, If the sequence number in the packet header is the same as the last sequence number observed (Step 210), then the counter for the number of duplicate packets is incremented and the packet is ignored (Step 212). Otherwise, information from the ACK packet header is stored in the node memory 502 (Step 214).

FIG. 14 shows the format in which a session record is condensed prior to being placed in the output queue to be written to disk. A condensed session record having the format of FIG. 14 exists for each session initiated during the execution of the method of the present invention. It is understood that the format of FIG. 14 is only one of a plurality of possible formats in which collected session information could be saved, as any of a number of said plurality of formats would serve to bring about the objects of saving disk access time and of decreasing the storage space necessary to save the collected session information.

First, FIG. 14 defines constants 220 associated with a condensed session record of the preferred embodiment. Second, FIG. 14 lists the possible states 222 through which a session may pass. Third, FIG. 14 lists possible states 224 of nodes participating in a session. A first group of fields 226 is collectively labeled "session identification" because they contain information identifying a session. A second group of fields 228 is collectively labeled "session status" because they contain enumerated and numerical values indicating the state of the session when a 'terminate session' packet was received. A third group of fields 230, collectively labeled "session connection event times," contains values indicating times at which events such as session initiation and termination occur. A fourth group of fields 232 is collectively labeled "counts of session packets." These fields contain counter fields for an initiator node and for a target node. The counters are set to zero when the session record is created and incremented thereafter as appropriate. Lastly, FIG. 14 shows a format of a data—record—type 234 which is a format used in certain "counts of session packets" fields.

FIG. 15 shows a format of a "count" file written to secondary storage, such as a magnetic disk drive. The count file contains values which are mostly non-session-specific data. The only fields in the "count" file that are session specific are the fields 236 collectively labeled "session layer counters" which comprise a local_sessions_attempted field, a total_sessions_attempted field, a local_sessions_completed field, a max_active_sessions field, an unopened_sessions field, a max_write_sessions field, and an unterminated-sessions field. Each of these "session layer counters" fields 236 (as well as the other fields of FIG. 15) exists in the memory of the node while the session information collecting part is executing. Each field initially is set to zero and is incremented as a session packet corresponding to the name of a field is encountered. For example, when the session information collecting part 92 has completed execution, the total_sessions_attempted field in the memory of the node 500 contains a number representing the total number of sessions attempted while the session information part was executing, and so on for the other "session layer counters" fields. Upon the completion of execution, all fields of FIG. 15 are written from the memory of the node to disk.

FIG. 15 also contains fields 238 collectively labeled "accounting parameters" some of which are not global counters. The version_number field contains the version number of the software embodying the present invention. The start_time field contains the time at which information collecting was started. The end_time field contains a time at which information collecting was ended. The record_count field contains the number of packet headers read from disk, if packet headers are not being read from the memory buffer. The buffer_size field contains the length of extracted DECnet packet headers. The area field contains a bitmap indicating which of, for example, 64 DECnet areas are presumed local based on the received Routing layer packets. If an area is local at some time during the course of a given session, the area is presumed to be local for the entire time of execution.

The byte_packet_hist field 240 contains a plurality of elements, with each element representing a count for a range of number of data bytes in a received session data packet. For example, if a first element represents a range that includes "3," a received packet containing 3 data bytes will cause the first element of the byte_packet_hist field to be incremented. Similarly, the message_size_hist field 250 contains a plurality of elements, with each element representing a count for a range of a number of packets constituting a message.

Figure 4:
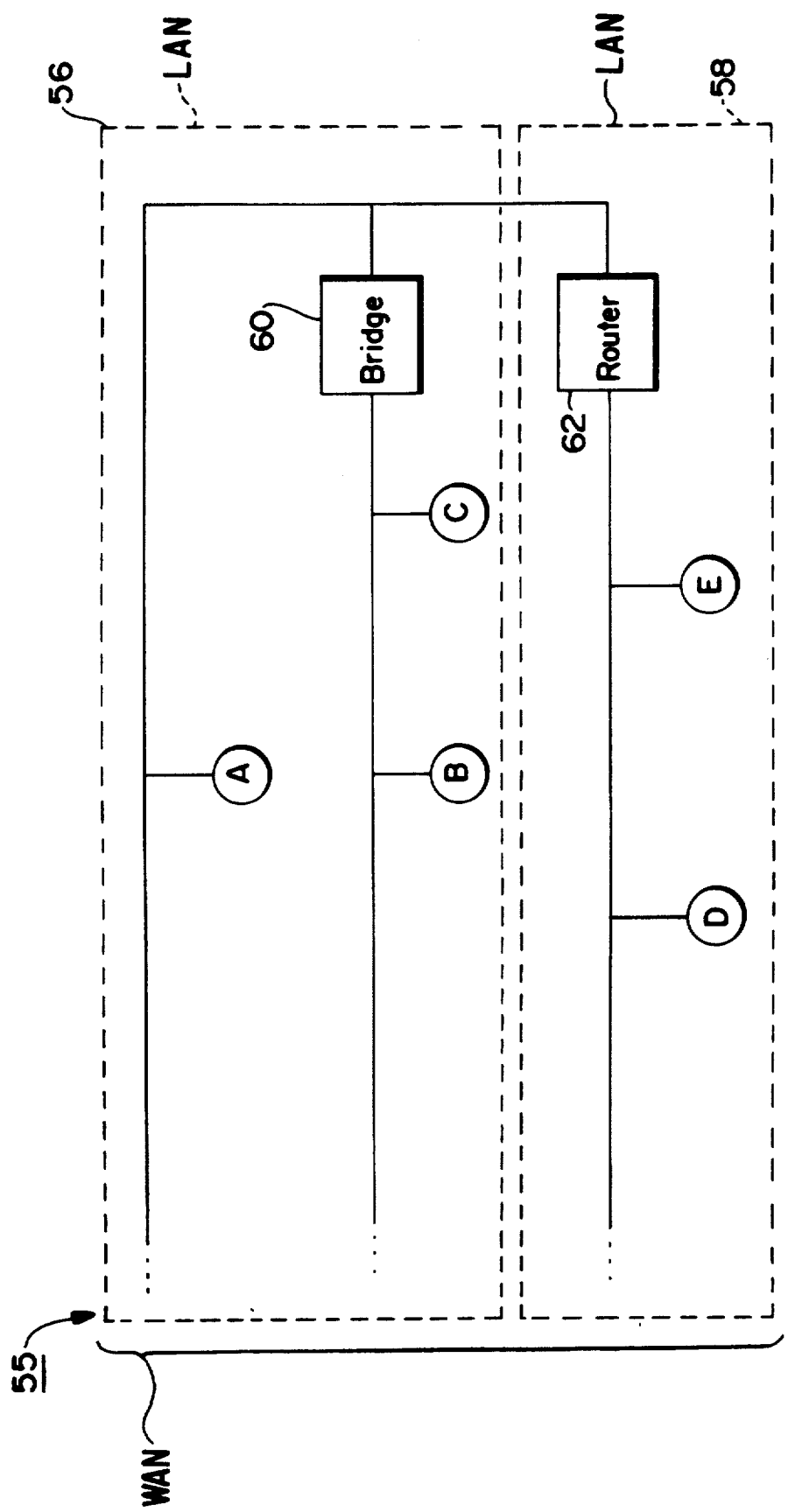
FIG. 4 is a general block diagram of another network with which the method of the present invention is used.

A second preferred embodiment of the present invention is embodied in a plurality of copies of a software program, each copy executing on a node in a separate portion of an Ethernet WAN, such as the network of FIG. 4. Each node executing the software program is operated in promiscuous mode.

Because each copy of the software program executes on a node in a separate portion of the network, each node will "see" a different set of packets. For example, referring to FIG. 4, a copy of the software program of the present invention executing on node D will never see packets sent from node A to node C because node C is on the other side of the router from node D. Neither will node D see packets multicast from node A, since multicast packets are not forwarded across routers. In contrast, a copy of the software program of the present invention executing on node B will see both packets sent from node A to node C (since node B is on the same side of the bridge as is node C) and packets multicast from node A.

Each of the plurality of software programs of the second preferred embodiment collects session information from the packets that it "sees" in a manner similar to the manner employed by the software program of the first preferred embodiment described in FIGS. 5-15. In addition, however, the software programs send the collected information to a central node upon receiving an information request from the central node.

The central node correlates the collected information received from the various nodes. For example, in FIG. 4, since both node C and node D "see" packets sent from node B to node E, both node C and node D will collect session information from those packets. The collector node contains a software proqram to eliminate this duplication of collected information from the global collected data, such as the total_sessions_attempted field. The collector node also recognizes duplications of single session information. For example, in the example above where information concerning packets sent from node B to node E is collected by both nodes C and D, only one set of collected information will ultimately be retained by the collector node.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for collecting information from a multiple node distributed processing system containing a plurality of user nodes and supporting information exchange among the nodes, the information exchange including a plurality of types of sessions having overlapping times of transmission and each consisting of transmissions of a plurality of session level packets between at least two of the nodes, wherein some of the session level packets have a predetermined format, including a packet header, the transmitted plurality of session level packets passing through selected ones of the nodes of the distributed data processing system, including a plurality of types of information characterizing the session and a session identifier identifying the specific one of the sessions in which the packet is being transmitted, the method comprising the steps performed by a predetermined one of the nodes of:

monitoring the session level packets passing through said predetermined node;

extracting a packet header from each of said monitored session level packets having said predetermined format;

identifying the session in which each of said extracted packet headers was transmitted;

accumulating by session identifier the characterizing information contained in the extracted header; and calculating session-specific statistical data for the sessions involving transmission of packets of said predetermined format.

2. The method of claim 1, wherein said monitoring and extracting steps are performed independently of said identifying, accumulating, and calculating steps, wherein said extracting step further includes the step of placing said extracted packet headers in a buffer, and wherein said identifying step further includes the step of waiting for an extracted packet header in said buffer.

3. The method of claim 1, wherein said session level packets include packets not having said predetermined format and wherein said extracting step further includes the step of accumulating information from each of said monitored session level packets not having said predetermined format.

4. The method of claim 1, wherein each software session is initiated by a user having a user name, wherein each one of said nodes of the system is identified by a node address, wherein said user name and said node address are contained in said packet headers of session level data packets of a predetermined type, and wherein said accumulated characterizing information includes said user name and said node address.

5. The method of claim 1, wherein all packets transmitted in a session contain a sequence number identifying its transmission order, and wherein the method further includes the step of re-sequencing any packets extracted in an order different from said transmission order.

6. The method of claim 1, wherein said data processing system includes a secondary storage medium, further including the step of storing said accumulated characterizing information on said secondary storage medium.

7. The method of claim 1, wherein said plurality of session level packets transmitted in said plurality of software sessions further includes session level control packets, and said accumulating step includes the step of initializing and terminating an accumulation data structure responsive to said session level control packets.

8. The method of claim 1, wherein said distributed data processing system includes a clock and wherein said statistical data includes timing information derived from said clock for said sessions, said method further including the step of timestamping each extracted packet header in accordance with said clock.

9. The method of claim 1, wherein said statistical data includes location information for said multiple nodes and information concerning the interconnections of said multiple nodes, said method further including the step of determining the interconnections of said multiple nodes.

10. An apparatus for collecting information from a multiple node distributed processing system containing a plurality of user nodes and supporting information exchange among the nodes, the information exchange including a plurality of types of sessions having overlapping times of transmission and each consisting of transmissions of a plurality of session level packets between at least two of the nodes, wherein some of the session level packets have a predetermined format, including a packet header, the transmitted plurality of session level packets passing through selected ones of the nodes of the distributed data processing system, including a plurality of types of information characterizing the session and a session identifier identifying the specific one of the sessions in which the packet is being transmitted, the apparatus comprising:

means for monitoring the session level packets passing through said predetermined node;

means for extracting a packet header from each of said monitored session level packets having said predetermined format;

means for identifying the session in which each of said extracted packet headers was transmitted;

means for accumulating by session identifier the characterizing information contained in the extracted header; and means for calculating session-specific statistical data for the sessions involving transmission of packets of said predetermined format.

11. The apparatus of claim 10, wherein said monitoring means and said extracting means operate independently of said identifying means, accumulating means, and calculating means, wherein said extracting means further includes means for placing said extracted packet headers in a buffer, and wherein said identifying means further includes means for waiting for an extracted packet header to be placed in said buffer.

12. The apparatus of claim 10, wherein said session level packets include packets not having said predetermined format and wherein said extracting means further includes means for accumulating information from each of said monitored session level data packets not having said predetermined format.

13. The apparatus of claim 10, wherein all packets transmitted in a session contain a sequence number identifying its transmission order, and wherein the method further includes means for re-sequencing any packets extracted in an order different form said transmission order.

14. The apparatus of claim 10, wherein said data processing system includes a secondary storage medium, further including means for storing said accumulated characterizing information on said secondary storage medium.

15. The apparatus of claim 10, wherein said plurality of session level packets transmitted in said plurality of sessions further includes session level control packets, and wherein said accumulating means includes means for initializing and terminating an accumulation data structure responsive to said session level control packets.

16. The apparatus of claim 10, wherein said distributed data processing system includes a clock and wherein said calculating means includes means, connected to said clock, for calculating said sessions, and means, in the calculating means, for timestamping each extracted packet in accordance with said clock.

17. The apparatus of claim 10, wherein said calculating means includes means for calculating location information for said multiple nodes and information concerning the interconnections of said multiple nodes, and means for determining the interconnections of said multiple nodes.

* * * * *